(12) United States Patent
Izumi et al.

(10) Patent No.: US 7,791,748 B2
(45) Date of Patent: Sep. 7, 2010

(54) IMAGE COMMUNICATION CONTROL METHOD, IMAGE COMMUNICATION CONTROL PROGRAM, AND IMAGE COMMUNICATION APPARATUS

(75) Inventors: Michihiro Izumi, Kawasaki (JP); Motoaki Yoshino, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 878 days.

(21) Appl. No.: 10/569,505

(22) PCT Filed: Aug. 31, 2004

(86) PCT No.: PCT/JP2004/012912

§ 371 (c)(1),
(2), (4) Date: Dec. 21, 2006

(87) PCT Pub. No.: WO2005/025202

PCT Pub. Date: Mar. 17, 2005

(65) Prior Publication Data

US 2007/0189266 A1     Aug. 16, 2007

(30) Foreign Application Priority Data

Sep. 2, 2003  (JP) .............................. 2003-309458

(51) Int. Cl.
*G06F 3/12* (2006.01)
(52) U.S. Cl. ...................... 358/1.15; 358/400; 358/401; 358/405; 358/425; 358/426.02; 358/426.15; 358/426.16; 358/434; 358/435; 358/436; 358/442; 358/468; 358/500
(58) Field of Classification Search ............... 358/1.15, 358/400, 401, 405, 425, 426.02, 426.15, 358/426.16, 434–436, 442, 468, 500
See application file for complete search history.

(56) References Cited

U.S. PATENT DOCUMENTS 5,349,649 A * 9/1994 Iijima .......................... 709/228

(Continued)

FOREIGN PATENT DOCUMENTS

JP      2002-368815       12/2002

(Continued)

OTHER PUBLICATIONS

Handley et al (RFC 2327, SDP Session Description Protocol, Apr. 1998, p. 7).*

(Continued)

*Primary Examiner*—King Y Poon
*Assistant Examiner*—Kenneth Kwan
(74) *Attorney, Agent, or Firm*—Fitzpatrick, Cella, Harper & Scinto

(57) ABSTRACT

When image communication is conducted by using one of a plurality of different image communication systems via a sending/receiving path including an IP network (101), a transmitter (105) and receivers (108, 108a, 112, 115) or devices (gateway (111, 113) or an IP network interface (109)) for relaying the image communication existing in the sending/receiving path store SDP media stream descriptions, which include different image communication systems usable by the transmitter and receivers, in an SIP message and send the SIP message, and select an image communication system for use in practical image communication in given order of priority and image communication control parameters to be used in the appropriate image communication system, on the basis of the SDP media stream descriptions. Whereby, an appropriate image communication system can be automatically selected from various image communication system that can be used between a calling terminal and a called terminal, without a need for a complicated operating procedure or setup procedure.

8 Claims, 11 Drawing Sheets

U.S. PATENT DOCUMENTS

| | | | |
|---|---|---|---|
| 5,742,905 A * | 4/1998 | Pepe et al. | 455/461 |
| 6,542,472 B1 * | 4/2003 | Onuma | 370/253 |
| 6,604,139 B1 * | 8/2003 | Sajina et al. | 709/224 |
| 6,845,389 B1 * | 1/2005 | Sen et al. | 709/204 |
| 2002/0194282 A1 * | 12/2002 | Saito et al. | 709/206 |
| 2003/0189720 A1 * | 10/2003 | Bei et al. | 358/1.15 |
| 2004/0103157 A1 * | 5/2004 | Requena et al. | 709/206 |
| 2004/0196506 A1 * | 10/2004 | Izumi et al. | 358/402 |
| 2005/0047389 A1 * | 3/2005 | Bond et al. | 370/351 |
| 2005/0058123 A1 * | 3/2005 | Horiba | 370/352 |
| 2006/0034260 A1 * | 2/2006 | Svedberg et al. | 370/352 |
| 2006/0095590 A1 * | 5/2006 | Miller | 709/246 |
| 2006/0117097 A1 * | 6/2006 | Ogasawara et al. | 709/223 |
| 2006/0155864 A1 * | 7/2006 | Izumi | 709/230 |
| 2006/0159072 A1 * | 7/2006 | Kim et al. | 370/352 |
| 2006/0217072 A1 * | 9/2006 | Poyhonen et al. | 455/67.11 |
| 2006/0227728 A1 * | 10/2006 | Baumann | 370/260 |
| 2006/0274892 A1 | 12/2006 | Izumi | |
| 2006/0294245 A1 * | 12/2006 | Raguparan et al. | 709/227 |
| 2007/0213078 A1 * | 9/2007 | Shaheen | 455/466 |
| 2008/0205381 A1 * | 8/2008 | Zhu et al. | 370/352 |

FOREIGN PATENT DOCUMENTS

| | | |
|---|---|---|
| JP | 2003-92657 | 3/2003 |
| JP | 2003-122651 | 4/2003 |
| JP | 2003122651 A * | 4/2003 |

OTHER PUBLICATIONS

Petrack et al (RFC 2848, The PINT Service Protocol, Network Working Group, Siemens Roke Manor Research, Jun. 2000, pp. 4 and 9).*

Handley et al., RFC2543 (SIP: Session Initiation Protocol), Mar. 1999.

ITU-T Recommendation H.323, Jun. 2006.

* cited by examiner

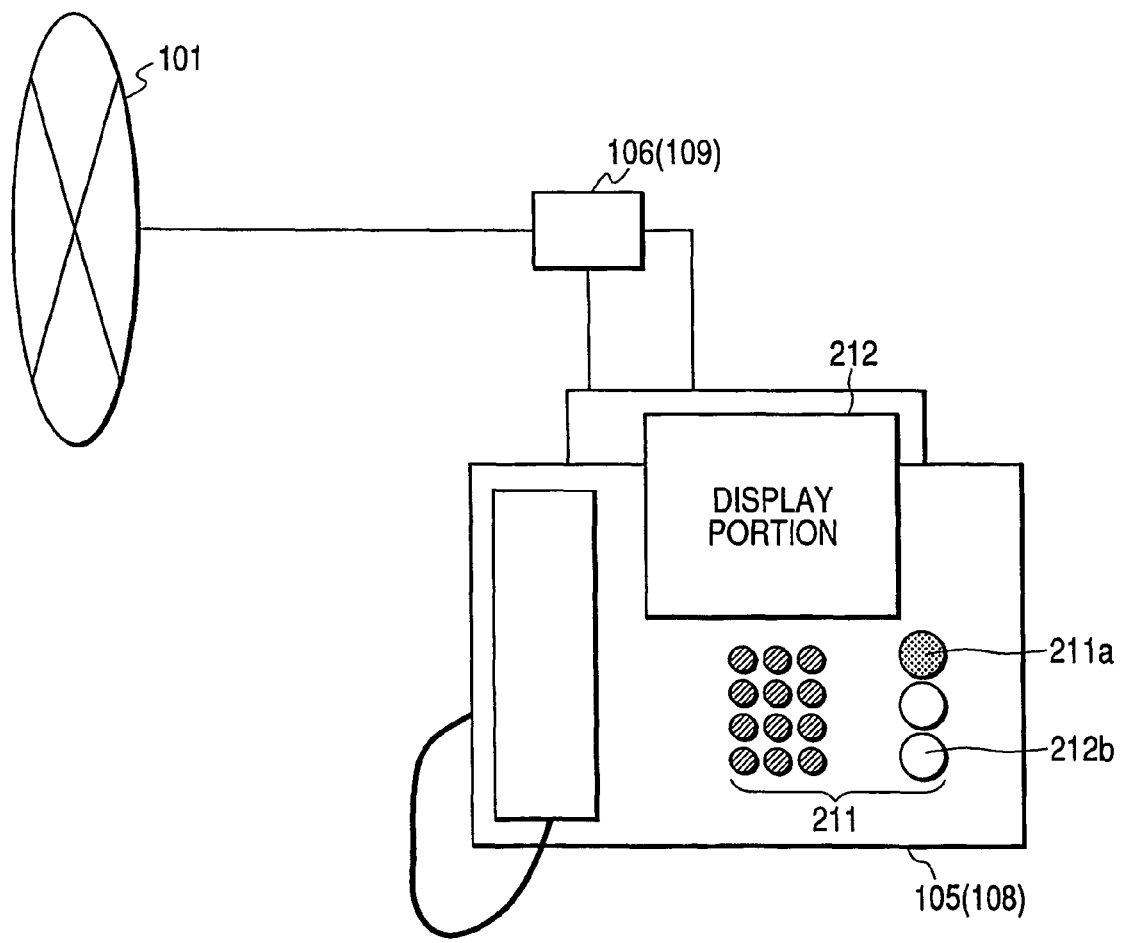

FIG. 5A m=image 25 direct_smtp tcp
m=image 80 ippfax tcp
a=photo_1 jpeg sycc

FIG. 5B m=image 51100 t38fax tcp
a=iso_a4 iso_b4 mr b/w

FIG. 5C m=image 25 t37fax tcp
a=iso_a4 iso_b4 tiff b/w

FIG. 5D m=audio 51300 t30fax rtp/avp
a=iso_a4 iso_b4 mr b/w

IMAGE COMMUNICATION CONTROL METHOD, IMAGE COMMUNICATION CONTROL PROGRAM, AND IMAGE COMMUNICATION APPARATUS

This application is a National Stage filing under 35 U.S.C. §371 of International Application No. PCT/JP2004/012912, filed Aug. 31, 2004, which in turn claims priority to Japanese Application No. 2003-309458, filed Sep. 2, 2003, the priority of which is hereby claimed, said International Application having been published in English, as International Publication No. WO 2005/025202 A1 on Mar. 17, 2005.

TECHNICAL FIELD

The present invention relates to an image communication control method, an image communication control program, and an image communication apparatus for conducting image communication using one of a plurality of different image communication systems.

BACKGROUND ART

In recent years, the spread of ADSL, FTTH, and other broadband networks are notable. Moreover, we can see a rapid spread in an IP telephone service for transmitting voices in a form of IP packets by utilizing a property of the broadband network, namely a high-speed transmission.

In the IP telephone service, speech communication voice data is sent or received between terminals having IP addresses on a TCP or UDP/IP layer in a Voice over IP (VoIP: for example, ITU-T Recommendation H.323, which is nonpatent literature 1 described below) protocol or the like. Therefore, it is necessary to convert a telephone number to an IP address. Nowadays, a session initiate protocol (SIP: RFC2543, which is nonpatent literature 2 described below) proxy server is generally used for the conversion from the telephone number to the IP address.

In the IP telephone communication using SIP, an input of a telephone number at a calling terminal causes sending of a session request message including a destination telephone number to the SIP proxy server (hereinafter, referred to as SIP proxy). Upon receiving the session request message, the SIP proxy acquires an IP address of a called terminal in the opponent party by performing necessary processing such as searching a domain name system (DNS: RDC1035) server. It then makes initial connection between the calling terminal and the called terminal as a proxy. The called terminal sends a response message in response to the session request message. Both of the messages are text streams represented by text (character codes).

The primary part of the SIP message is described in a format similar to a header description format of e-mail or the like such as "attribute: value", and in order to identify mutual functions of the terminals, it is possible to describe a processing function (a communication function) about a media stream of a terminal of interest in a format conforming to a session description protocol (SDP: RFC 2327, which is nonpatent literature 3 described below). The following shows an example of a declaration (offer) of the calling terminal in SDP described in an appendix of RFC2543 titled "B.1 Configuring Media Streams."

v=0
0=alice 2890844526 2890844526 IN IP4 host.anywhere.com
c=In IP4 host.anywhere.com
m=audio 49170 RTP/AVP 0
a=rtpmap:0 PCMU/8000
m=video 51372 RTP/AVP 31
a=rtpmap:31 H261/90000
m=video 53000 RTP/AVP 32
a=rtpmap:32 MPV/90000

As stated above, SDP is formed by arranging a single-character mnemonic (v, o, c, m or the like) followed by "=" and subsequently arranging text representation values delimited by a blank or a slash. Particularly, in the above, mnemonic "m" can be used to represent a type of a media stream that can be processed by the terminal such as audio or video ("v," "o," and "c" are for use in identifying a protocol version, identifying an initiator or an owner of a session (or message) at issue, and describing various connection information, respectively).

On the other hand, facsimile machines have been used as devices capable of sending or receiving image data easily before the spread of the IP network such as the Internet. A facsimile machine is capable of sending image data to a station in the opponent party very easily only by a specification of a telephone number. It is still widely used even at the present time when people can send images via e-mail from a PC, a mobile phone, or any other terminal.

In the future, an image communication apparatus such as a facsimile machine will need be capable of communication using various image communication systems as described later as well as communication via a public switched telephone network (PSTN: Non-IP network) independently of whether it is for use in home or office.

For example, at present, a so-called Internet facsimile protocol described in ITU-T Recommendation T.37 or T.38 is well known as a procedure for using the facsimile machine for communication on an IP network. In the Internet facsimile protocol described in these Recommendations, sending and receiving terminals are required to use the IP network directly or indirectly.

On the IP network, if there is no need to use a facsimile-related procedure, image data can be sent or received by using a faster system such as, SMTP, FTP, HTTP, RCP, IPPFAX or any other general data sending/receiving protocol on the IP network.

A facsimile signal in the conventional facsimile protocol is an analog speech signal. Therefore, it is also possible for both of a calling party and a called party to conduct image communication by sending or receiving facsimile data in an analog speech signal format on the IP network by using the above VoIP technology (so-called considered-speech Internet facsimile communication).

Naturally, if a station in the opponent party is a facsimile machine connected to a PSTN (non-IP network), it is necessary for a calling party to perform the facsimile communication in the conventional facsimile protocol (for example, T.30 protocol). In the image communication using the conventional facsimile protocol such as the T.30 protocol, there are two assumable cases: one is a case where both of the calling and called terminals conduct communication via the PSTN and the other is a case where the calling party accesses the IP network and sends a facsimile signal with considered speech by means of VoIP communication. In both cases, a reliable execution of image communication is required.

At the present stage, however, there are not a few image communication apparatuses having various and many image communication systems implemented as stated above: even if a plurality of image communication systems can be used in an apparatus, it requires a complicated operating procedure or setup in most cases. For example, there are complications at present such that at least it is necessary to specify which system should be used among the above image communication systems for each called party and that a user has to check communication systems that the called party can use, in advance.

In view of these problems, there may be an arrangement that the above SIP service is used at least regarding the communication via the IP network so that both terminals mutually identify applicable image communication systems (for example, T.37 facsimile communication, T.38 facsimile communication, SMTP, FTP, HTTP, RCP, IPPFAX or any other general-purpose IP protocol communication, considered-speech Internet facsimile communication) using an SDP media stream description in an SIP message.

It has, however, a problem that a media stream defined by the current RFC2327 is limited to a range of an image (particularly, an animation or motion picture stream for use in a video (or TV conference) and a speech stream and therefore it is insufficient to identify various image communication systems such as the T.37 facsimile communication, the T.38 facsimile communication, the SMTP, FTP, HTTP, RCP, IPP-FAX or any other general-purpose IP protocol communication, the considered-speech Internet facsimile communication.

In addition, if image communication is conducted by using the above SMTP, FTP, HTTP, RCP, IPPFAX or any other IP service, instead of the facsimile protocol, generally a format of a transferred data file is not assured in these protocols. Therefore, there has been a problem such that, for example, it is impossible to exchange information about a paper size available for print processing at the receiving terminal and an applicable image compression technology or other capabilities of the terminal. Therefore, even if the receiving terminal receives image data, it cannot decode the image data or cannot perform optimum output processing (printing or the like) for the image.

DISCLOSURE OF THE INVENTION

In view of the above problems, it is an object of the present invention to make it possible to select automatically various image communication systems, their control parameters, and communication data formats that can be used between a calling terminal and a called terminal without a need for a complicated operating procedure or setup procedure only by specifying selection information of the opponent party (a telephone number, an e-mail address, etc.) so as to achieve fast and reliable image communication.

BRIEF DESCRIPTION OF THE DRAWING

FIG. 2B is a block diagram showing an external configuration of the image communication apparatus to which the present invention is applied;

FIG. 5A is an explanatory diagram showing an example of an SDP media stream syntax used in the present invention;

FIG. 5B is an explanatory diagram showing an example of an SDP media stream syntax used in the present invention;

FIG. 5C is an explanatory diagram showing an example of an SDP media stream syntax used in the present invention;

FIG. 5D is an explanatory diagram showing an example of an SDP media stream syntax used in the present invention;

BEST MODES FOR CARRYING OUT THE INVENTION

The preferred embodiments of the present invention will now be described in detail hereinafter with reference to the accompanying drawings. The following describes embodiments of an image communication apparatus for conducting image communication via an IP network and a PSTN, its control method, and its control program.

First Embodiment

Figure 1A:
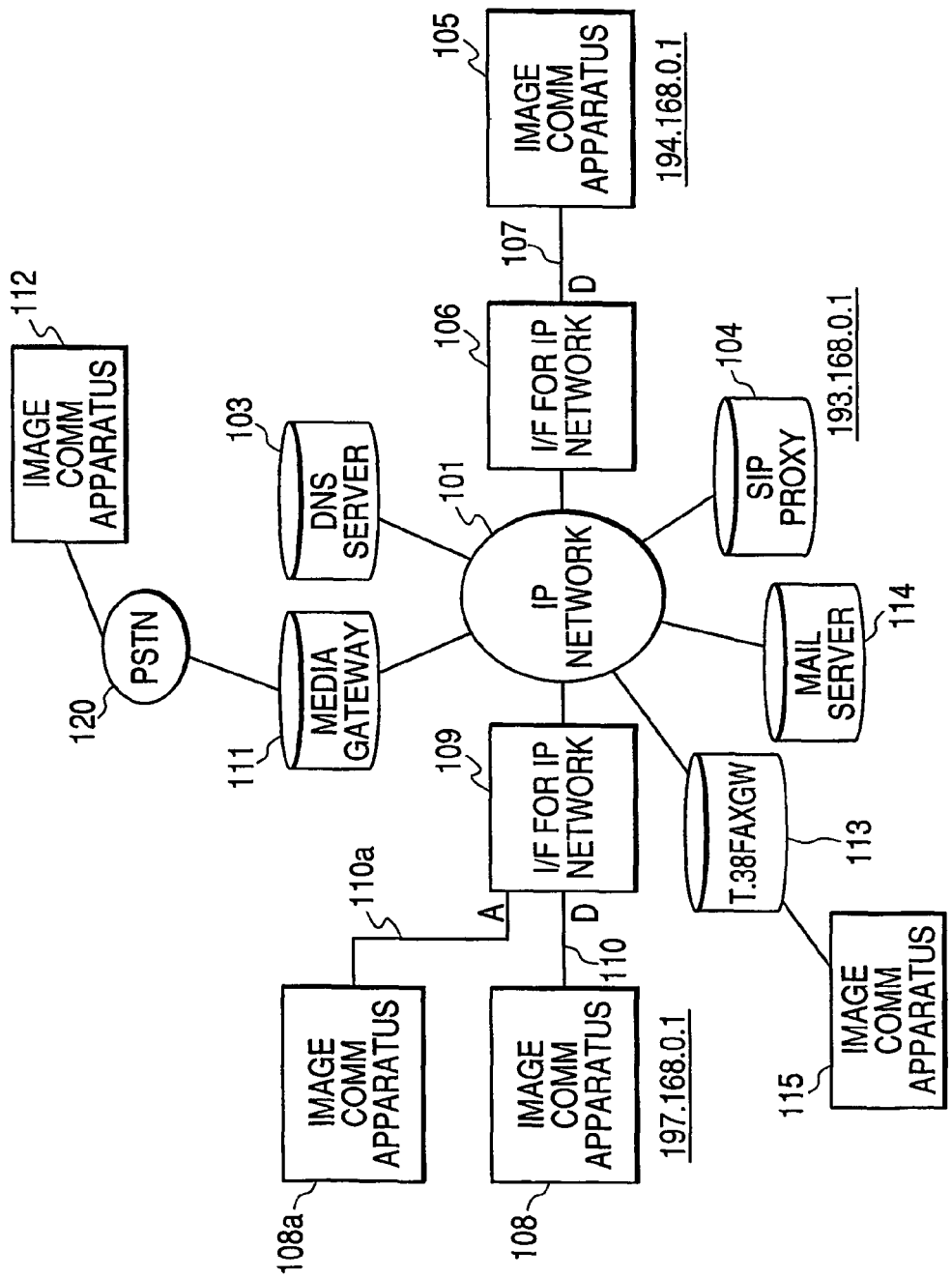
FIG. 1A is a block diagram showing a configuration of a network system including image communication apparatuses to which the present invention is applied.

Referring to FIG. 1A, there is shown a configuration of a network system to which this embodiment is applicable. In FIG. 1A, reference numeral 101 designates an Internet network (IP network). A server as described below is prepared on the IP network 101.

A domain name system (DNS) server 103 converts a domain name to an IP address.

An SIP proxy for VoIP (global IP address: 193.168.0.1) 104 provides a session initiation protocol (SIP) service for a call connection process in an IP telephone service.

Reference numeral 113 designates a facsimile gateway defined in ITU-T Recommendation T.38. The facsimile gateway 113 is connected to an image communication apparatus 115 via a PSTN or an internal (or private) telephone line. The image communication apparatus 115 is a G3 analog facsimile machine for conducting facsimile communication in ITU-T Recommendation T.30 analog facsimile protocol.

Reference numeral 114 designates a mail server. There are mainly two types of mail servers: a server for accepting a transmission or for performing a delivery between servers according to SMTP or the like and a server for performing a delivery to a final destination according to POP, IMAP, or the like. To simplify the description here, the mail server 114 is assumed to have both of the functions.

A media gateway 111 is installed by a telephone carrier or a network (particularly, IP telephone) carrier for a connection between the IP network 101 and a PSTN 120. The media gateway 111 performs a digital-analog conversion of a signal between a speech signal and an IP packet and controls an outgoing call to a subscriber terminal (speech terminal) connected to the PSTN 120. The image communication apparatus 112, which is a G3 analog facsimile machine connected to the PSTN 120, conducts facsimile communication in ITU-T Recommendation T.30 analog facsimile protocol.

Reference numerals 105 and 108 designate a first image communication apparatus (global IP address: 194.168.0.1) and a second image communication apparatus (global IP address: 197.168.0.1), respectively. These image communication apparatuses 105 and 108 are capable of image communication (and voice communication) via the IP network 101, unlike image communication apparatuses 112, 115, and 108a described later that can only conduct analog communication.

IP network interfaces 106 and 109 include at least a given network terminating unit. While a configuration of the network terminating unit depends upon a method of a connection with the IP network, the following exemplifies a case of an ADSL.

For the ADSL, network terminating units for the IP network interfaces 106 and 109 are ADSL modems or the like. The ADSL modem is provided with CSMA/CD interfaces 107 and 110 for connection with local devices, and in some cases an analog telephone interface for a connection of an analog telephone and an analog interface 110a for sending or receiving digital data (shown for the IP network interface 109 only). The IP network interfaces 106 and 109 multiplex and modulate out-speech-band signals with in-speech-band signals of the analog telephone interface and sends them to a communication line. Furthermore, contrary to the above, they divide signals received from the communication line into the in-speech-band signals and the out-speech-band signals and output them to the analog telephone interface and the CSMA/CD interface 107, respectively.

In some cases, each of the IP network interfaces 106 and 109 is integrated with a router (for example, a broadband router) between the local network and the network terminating unit (or each has a separate device inserted therebetween). This type of router includes a packet filtering or network address translation (NAT) function and is used to achieve a firewall function.

Furthermore, the analog interface 110a of the IP network interface 109 is connected to an image communication apparatus 108a configured as an analog facsimile machine similar to those of the image communication apparatuses 112 and 115.

Figure 2A:
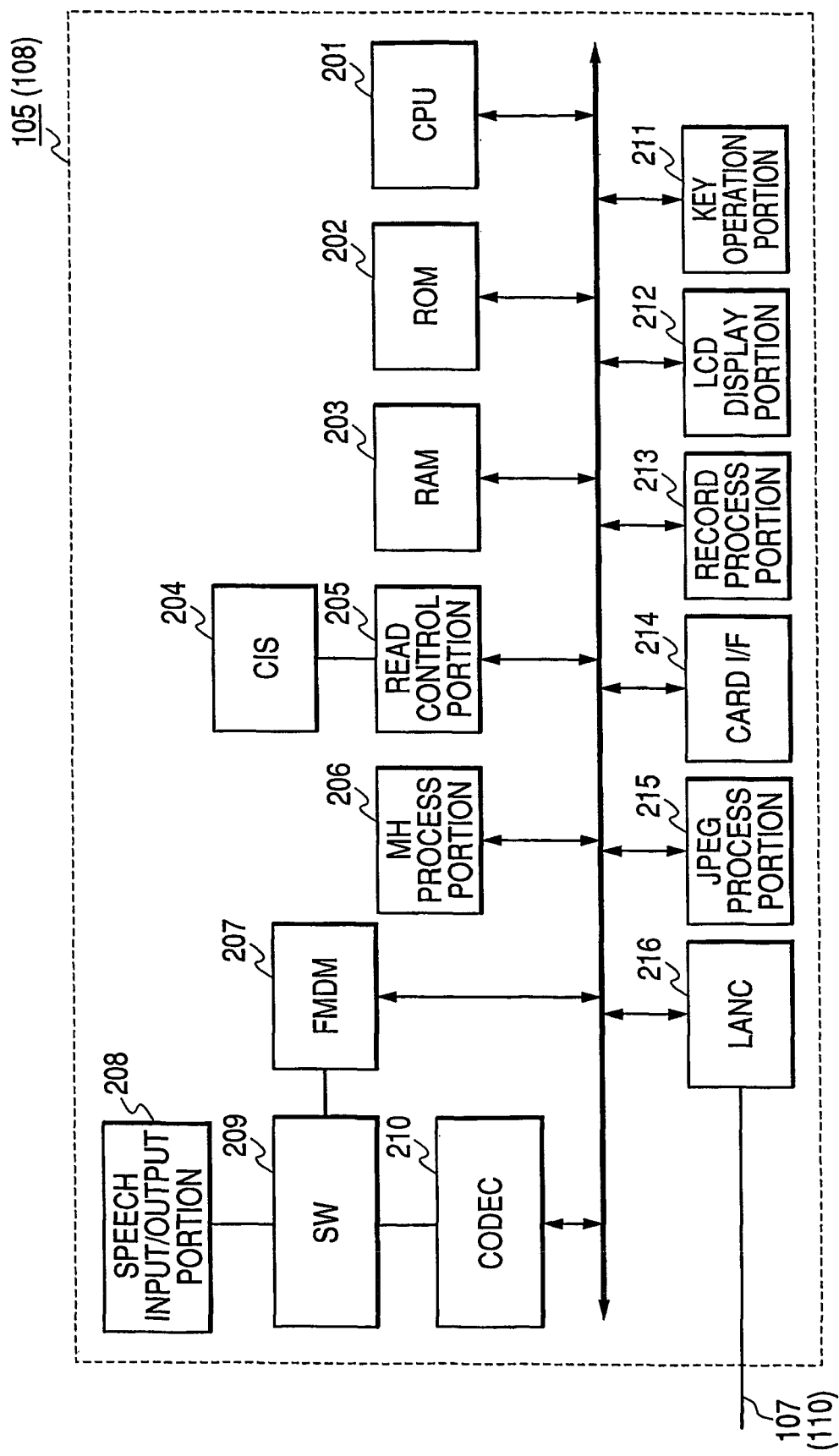
FIG. 2A is a block diagram showing an internal configuration of an image communication apparatus to which the present invention is applied.

Referring to FIG. 2A, there is shown a configuration of the image communication apparatus 105 (or the image communication apparatus 108). In FIG. 2A, a CPU 201 controls the image communication apparatus according to a program stored in a ROM 202. It also performs TCP/IP protocol processing and composing image data into a TCP/IP frame is achieved by a control of the CPU. A RAM 203 is used as a work memory at a program execution and used for buffering image data to be sent or received.

A contact image sensor (CIS) 204 converts images on a document to analog signals. A read control portion 205 converts analog signals output from the CIS 204 to digital data. The converted digital data is transferred to the RAM 203 with a control of the CPU 201 and sent (or recorded, or the like) as described later.

An MH coding or decoding process portion 206 encodes read image data into MH codes to compress data at sending an image. At receiving, it decodes the MH codes of the encoded image data.

A facsimile modem 207 modulates the MH-coded data and converts it to in-speech-band analog signals, which are transmittable via an analog line, at sending. At receiving, it demodulates the received analog signals and outputs MH-coded data.

A speech input/output portion (handset) 208 comprises a microphone for inputting speech and a speaker for outputting speech.

Reference numeral 209 designates an analog switch. The switch 209 connects the facsimile modem 207 or the speech input/output portion 208 to a CODEC 210.

In this embodiment, the CODEC 210 is assumed to support at least a coding/decoding system of a VoIP system for facsimile signals sent or received as speech signals or considered speech and a coding/decoding system necessary for sending or receiving T.38 Internet facsimile signals (particularly, tone signals).

A key operation portion 211 comprises a dial and operation buttons for sending or receiving with a facsimile machine. The key operation portion 211 forms user interface means together with the LCD display portion 212.

A record process portion 213 is configured for use in an arbitrary recording mode such as an electrophotographic process or an inkjet method. The record process portion 213 converts image data received (or input in another method) to raster data for printing and outputs it as printed data.

Reference numeral 214 designates a card interface, which can be connected to a memory card storing JPEG images taken by a digital camera.

Reference numeral 215 designates a JPEG process portion, which is for use in JPEG compression of JPEG images input via the card interface. In addition, it decompresses JPEG image data received.

A LAN controller 216 sends or receives data via the CSMA/CD interface 107 (110) to or from the IP network interface 106 (109). After a transfer of data to be sent to the LAN controller 216, it appends a media access control (MAC) frame header and a frame check sequence (FCS) to the data and sends it to the CSMA/CD interface 107.

Referring to FIG. 2B, there is shown an external configuration of the image communication apparatus 105 (108) shown in FIG. 1A. In FIG. 2B, there is shown an Internet network (IP network) 101 to which the image communication apparatus 105 (108) is connected. In this embodiment, the IP network 101 is connected to the image communication apparatus 105 (108) by means of a wireline connection, namely ADSL (Note that there can be a wire (including an optical fiber) or wireless LAN system, a CATV system, or other arbitrary connection systems besides ADSL). For the ADSL, the IP network interface 109 is used as a terminating unit. There are provided an analog telephone line connection on the side of the IP network 101 of the IP network interface 109 and a LAN connection on the side of the image communication apparatus 105 (108).

Furthermore, an image communication key 211a is provided in the operation portion 211 shown in FIG. 2A of the image communication apparatus 105 (108). The image communication key 211a functions similarly to a "send" button of a normal facsimile machine. Depression of the image communication key 211a starts image communication (for example, sending an image read by the CIS 204 or a JPEG image input from the card interface 214). In addition, the operation portion 211 is provided with a speech communication key 211b, which is for use in selecting a speech communication mode.

The following describes a communication control in the above configuration.

In this embodiment, the image communication apparatus 105 functions as a calling and image sending terminal. A called and image receiving terminal is one of the image communication apparatuses 108, 108a, 112, and 115. The image communication apparatus 105 in this embodiment is capable of selecting an appropriate image communication system for any of these called and image receiving terminals so that an image can be sent there.

Subsequently, an outline of the image communication systems used for the called and image receiving terminals will be described hereinafter.

First, the image communication apparatuses 108 and 108a require a use of the image communication systems as shown in FIGS. 1B, 1C, 1D, and 1E. It should be noted here that the image communication apparatuses 108 and 108a are connected to the CSMA/CD interface (digital (LAN) interface) 110 of the IP network interface 109 and the analog interface 110a, respectively, as shown in FIG. 1A.

Figure 1B:
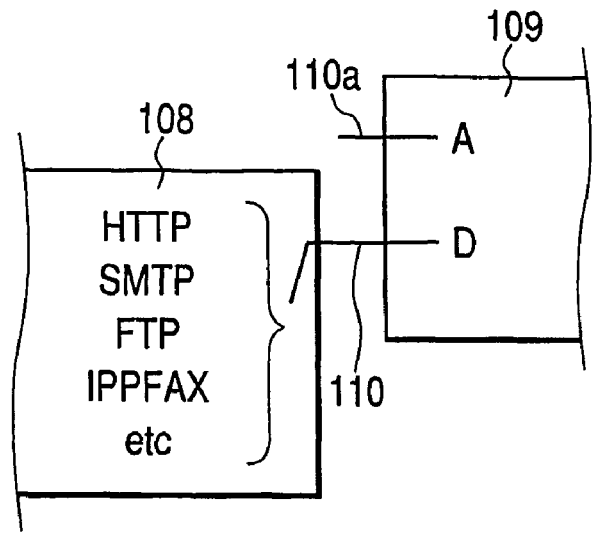
FIG. 1B is an explanatory diagram illustrating image communication systems that a receiving party can execute in the network system shown in FIG. 1.

Referring to FIG. 1B, there is shown image communication in a non-facsimile protocol on the IP network. Only by implementing a protocol corresponding to the image communication apparatus 108, an image can be sent (received) by using an arbitrary non-facsimile protocol on the IP network such as, HTTP, SMTP, FTP, or IPPFAX. In this process, there is no need to use a facsimile protocol or an analog facsimile modulation, and therefore the image communication apparatus 105 in the sending party sends the transmission image data as an image file in a format (TIFF, JPEG, GIF, PNG, etc.) suitable for each protocol.

Figure 1C:
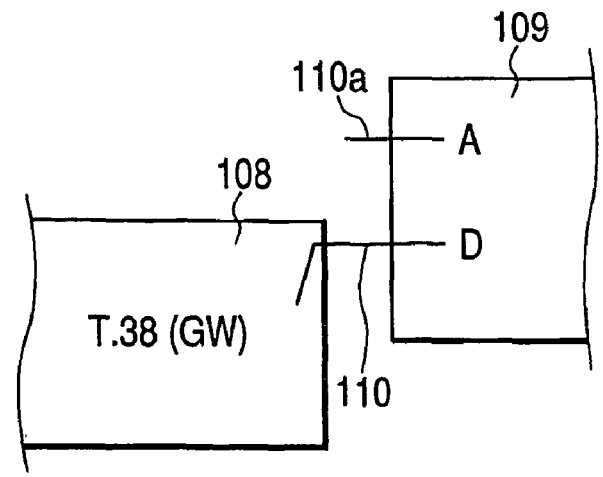
FIG. 1C is an explanatory diagram illustrating an image communication system that the receiving party can execute in the network system shown in FIG. 1.

Referring to FIG. 1C, there is shown a case where the image communication apparatus 108 is configured as a so-called "Internet facsimile machine" in ITU-T Recommendation T.38. In this case, the image communication apparatus 108 functions as a receiving facsimile gateway in Recommendation T.38. Therefore, in this case the image communication apparatus 105 needs to send a G3 facsimile signal packetized based on Recommendation T.38 as a sending facsimile gateway in Recommendation T.38. The image communication apparatus 108 decodes the received G3 facsimile signal based on Recommendation T.38 and outputs the decoded G3 data in printing, displaying, or any other method or sends it to another client G3 facsimile machine via a PSTN or a local area analog network.

Figure 1D:
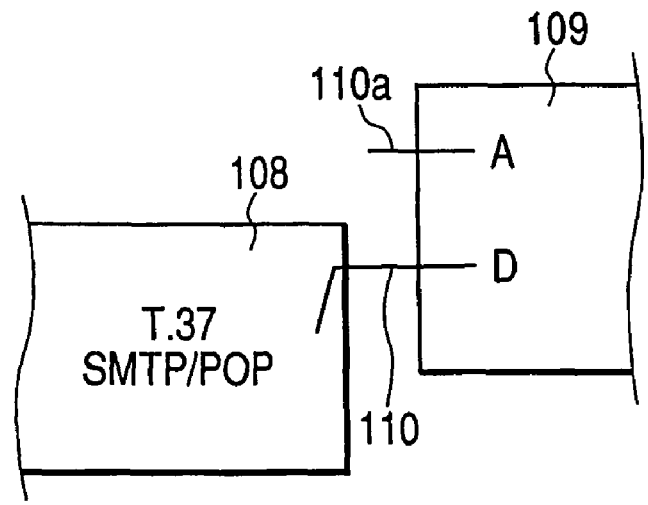
FIG. 1D is an explanatory diagram illustrating an image communication system that the receiving party can execute in the network system shown in FIG. 1.

Referring to FIG. 1D, there is shown a case where the image communication apparatus 108 functions as an Internet facsimile machine in ITU-T Recommendation T.37. In this case, the image communication apparatus 105 needs to send image data as e-mail text including MIME-encoded TIFF-G3 facsimile data based on ITU-T Recommendation T.37 to the image communication apparatus 108. This e-mail text is directly sent to the image communication apparatus 108 if the image communication apparatus 108 can receive e-mail directly (in an SMTP protocol or the like). Unless the image communication apparatus 108 can receive e-mail directly, the e-mail is sent to an ISP mail server of the image communication apparatus 108, and the image communication apparatus 108 receives the received mail text including image data by using a POP, IMAP, or any other protocol.

Figure 1E:
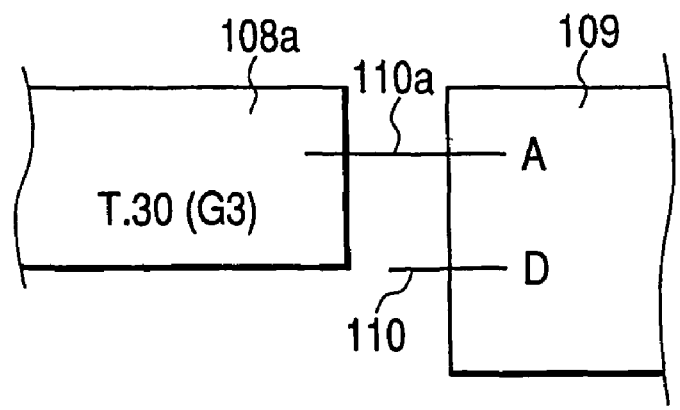
FIG. 1E is an explanatory diagram illustrating an image communication system that the receiving party can execute in the network system shown in FIG. 1.

Referring to FIG. 1E, there is shown a case where the image communication apparatus 108a configured as a G3 analog facsimile machine is connected to the analog interface 110a of the IP network interface 109. In this case, the image communication apparatus 108a can receive only analog speech signals. Therefore, the image communication apparatus 105 digitizes analog facsimile signals based on ITU-T Recommendation T.30 as speech signals by using the CODEC 210 and sends them in the VoIP protocol.

For the image communication apparatus 115 in FIG. 1A, a function of the image communication apparatus 108 described with referring to FIG. 1C may be considered divided into functions of the facsimile gateway 113 and the image communication apparatus 115 configured as a G3 analog facsimile machine. In this case, the image communication apparatus 105 needs to conduct the T.38 Internet facsimile communication as described with referring to FIG. 1C.

For the image communication apparatus 112 connected to the PSTN 120 in FIG. 1A, it is necessary to conduct communication via the media gateway 111. The image communication apparatus 112 is configured as a G3 analog facsimile machine. In this case, the image communication apparatus 105 needs to digitize analog facsimile signals based on ITU-T Recommendation T.30 as speech signals by using the CODEC 210 and to send them in the VoIP protocol in the same manner as for the image communication apparatus 108a in FIG. 1E.

As stated hereinabove, the image communication apparatus 105 needs to select appropriately one of different image communication systems as described above to communicate with the image communication apparatus 108, 108a, 112, or 115.

More specifically, in this embodiment the image communication apparatus 105 should support the following image communication systems:

(1) IP image communication in non-facsimile protocol
(2) ITU-T Recommendation T.38 Internet facsimile communication
(3) ITU-T Recommendation T.37 Internet facsimile communication
(4) Considered-speech ITU-T Recommendation T.30 (G3) facsimile communication While these image communication systems (media streams) cannot be identified by using an SDP notation used for an SIP message at present, the media streams can be represented by expanding (or developing) SDP media stream descriptions as shown in FIGS. 5A, 5B, 5C and 5D.

Referring to FIG. 5A, there is shown an example of an SDP media stream description for declaring (offering) non-facsimile protocols, SMTP and IPPFAX as image communication systems. In descriptions "m=image 25 direct_smtp tcp" and "m=image 80 ippfax tcp," "image" means that a media type is a static image. Numerals 25 and 80 indicate port numbers to be used. While a port number is arbitrary, they indicate port numbers corresponding to SMTP and IPPFAX (in general, an HTTP port/protocol is used for a data transfer) as well-known port numbers, here. Terminals can use arbitrary numbers for them.

Figure 3A:
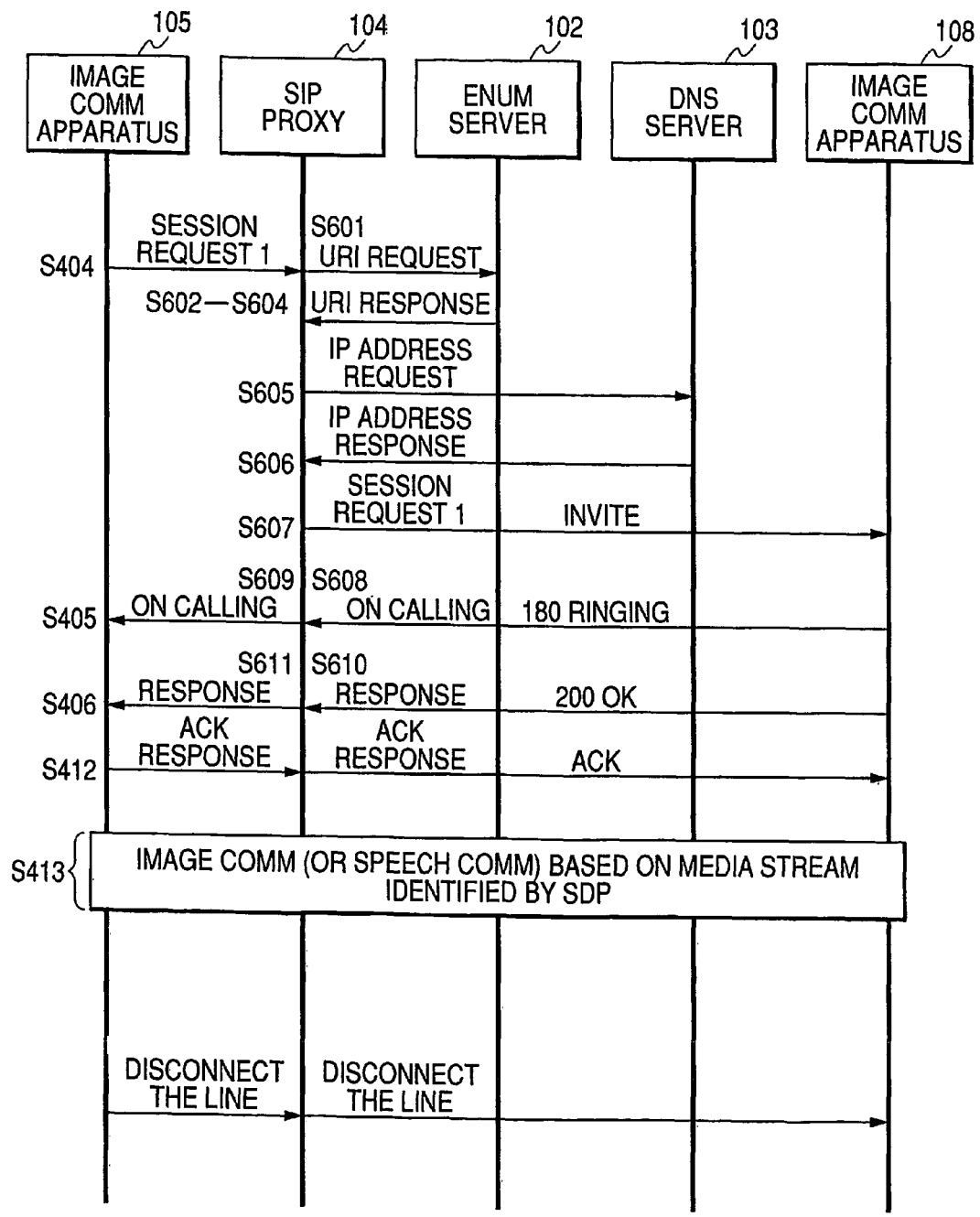
FIG. 3A is an explanatory diagram showing an SIP sequence for making a call connection from the image communication apparatus 105 in FIG. 1 to the image communication apparatus 108 in FIG. 1.
Figure 3B:
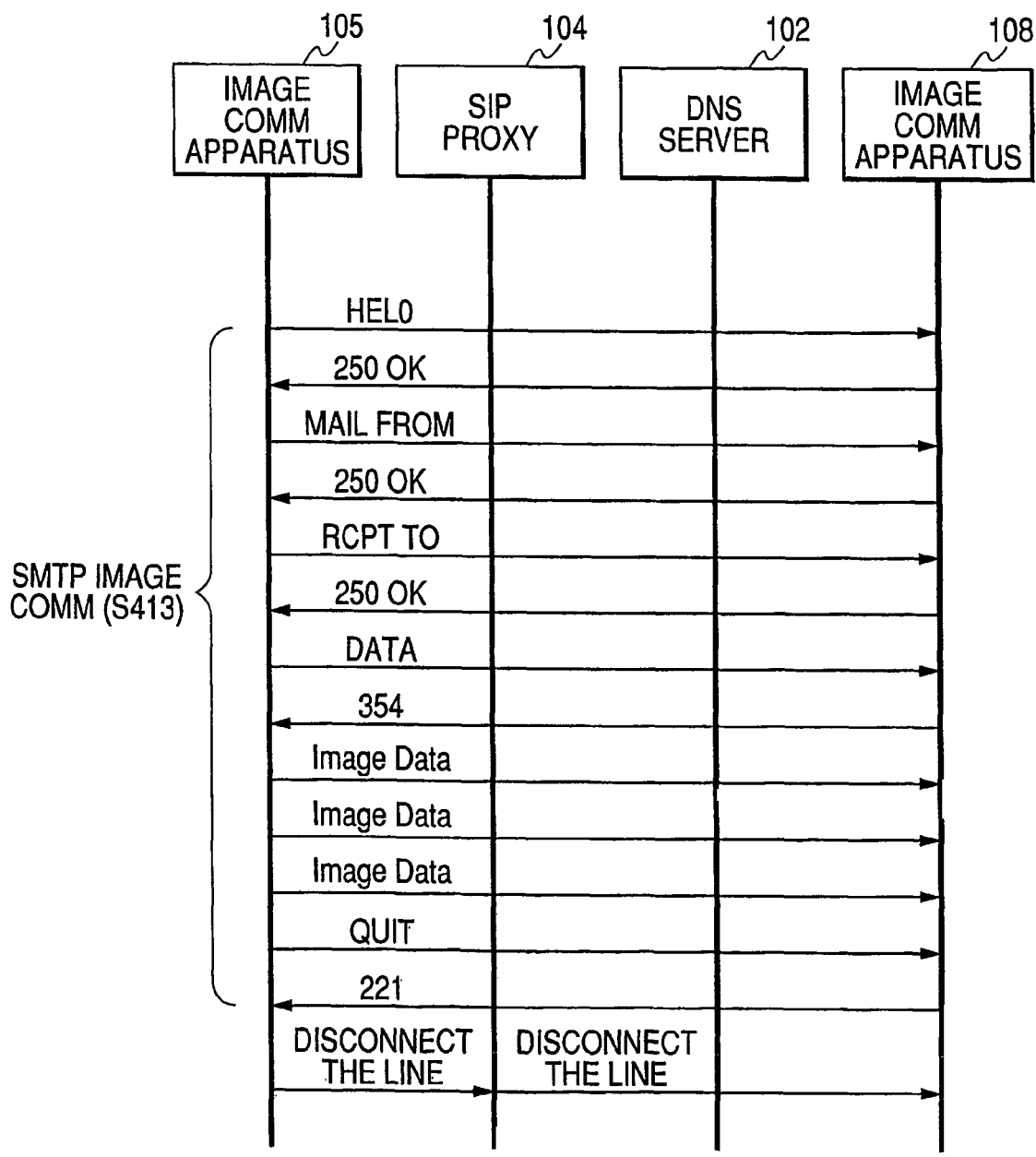
FIG. 3B is an explanatory diagram showing an example of a communication sequence of image communication started subsequently to the procedure in FIG. 3A.

While "direct_smtp" can be simply "smtp", "direct_smtp" communication in this embodiment indicates a communication system in which an image file is transferred directly between image communication terminals by using a simple mail transfer protocol (SMTP) as shown in FIG. 3B described later, unlike ITU-T Recommendation T.37. "tcp" means that a TCP enabling a resending control is used as a transport layer protocol.

If an FTP or HTTP protocol is used as a non-facsimile protocol, these non-facsimile protocols can be declared by changing a "direct_smtp" or "ippfax" portion in FIG. 5A to "ftp" or "http."

At line 3 in FIG. 5A, an "a=" syntax is used to declare an attribute of an image sent as an image communication control parameter for use in the image communication further. The description "a=photo_1 jpeg sycc" means that a sent image copy has photograph size L, JPEG image compression is applied, and a color space is sYCC which is used for a digital camera.

Referring to FIG. 5B, there is shown an example of an SDP media stream description for declaring a T.38 Internet facsimile communication system. In the description "m=image 51100 t38fax tcp", "image" means that a media type is a static image. Numeral 51100 indicates a port number (an arbitrary port number can be used), and "t38fax" means that the ITU-T Recommendation T.38 protocol is used as an image sending protocol. "tcp" means that a TCP enabling a resending control is used as a transport layer protocol.

In FIG. 5B, an "a=" syntax is used to declare "a=iso_a4 iso_b4 mr b/w" as an image communication control parameter for use in the image communication. Descriptions "iso_a4" and "iso_b4" in this example mean that A4 and B4 recording paper sizes are applicable, respectively. While this syntax can also be used to declare a sent image copy size, only a single type is generally specified for the size. "mr" means that an applicable image compression is MR and "b/w" indicates a black-and-white image (which can be sent or can be recorded).

Similarly, referring to FIG. 5C, there is shown an example of an SDP media stream description for declaring a T.37 Internet facsimile communication system. Respective mnemonics have the same meanings as for the above: "image" means that a media type is a static image; "25" indicates a port number to be used; "t37fax" indicates an image sending protocol. "tcp" means that a TCP enabling a resending control is used as a transport layer protocol.

Since the ITU-T Recommendation T.37 protocol is for use in sending facsimile image data in a MIME format via e-mail, the "a=" syntax in FIG. 5C includes the same size declaration as in FIG. 5B with a "tiff b/w" mnemonic added, indicating that the sent image is a black-and-white image in a TIFF format. To indicate receiving capabilities of the receiving party, it is possible to provide a list showing mnemonics indicating applicable compression methods (file formats) such as "tiff", "jpeg", and "color" and enabled color recording (and "sycc" or other color space information, if necessary).

In the T.37 Internet facsimile communication system, generally the sending party sends facsimile image data in a MIME format via e-mail to the ISP mail server and the receiving party downloads the e-mail from the ISP mail server (which is sometimes different from one for the above sending party) in a POP3 or any other protocol in most cases. Therefore, the apparatuses in the sending party and the receiving party rarely access each other directly. Thereby, the port number ("25" in FIG. 5C) can be omitted.

Referring to FIG. 5D, there is shown an example of an SDP media stream description for declaring a considered-speech T.30 facsimile communication. In the description "m=image 51300 t30fax rtp/avp", "image" means that the media type is a static image and "51300" and "t30fax" indicate a port number to be used and T.30 protocol used as an image sending protocol, respectively. "rtp/avp" means that the image data is sent as speech in a considered-speech format.

In FIG. 5D, "a=iso_a4 iso_b4 mr b/w" is further declared as an image communication control parameter for use in image communication by means of an "a=" syntax. In this syntax, "iso_a4 iso_b4" indicates image sizes of received (or sent) images, "mr" means that an applicable image compression is MR, and "b/w" indicates a black-and-white image (which is sent or can be recorded).

In the communication terminals, it is assumed that the SDP media stream descriptions as shown in FIGS. 5A, 5B, 5C, and 5D should be recognized in order of given priority, as described later. For example, in this embodiment, priorities are given to descriptions in the order of line. If one line includes declarations in a plurality of identical categories (for example, the image sizes in the above), it is assumed that a left-hand declaration has priority. More specifically, when declaring its own capabilities, an earlier description (in the upper portion or on the left hand in the same line) should be a declaration that should be preferentially adopted by the opponent party.

In addition, an SIP message including one of the SDP media stream descriptions as shown in FIGS. 5A, 5B, 5C, and 5D is returned to the calling party (image communication apparatus 105) by an apparatus capable of functioning as a called party of an SIP session (as well as an image communication apparatus at an end of the communication path).

For example, in the SIP session, the IP network interface 109 connected to the image communication apparatuses 108 and 108a can respond to the SIP session. In this condition, assuming that the image communication apparatus 108 supports all of the image communication systems shown in FIGS. 1B, 1C, and 1D and the image communication apparatus 108a supports the considered-speech facsimile communication system shown in FIG. 1E, the IP network interface 109 only needs to return an SIP message including an SDP media stream description, in which the following descriptions shown in FIGS. 5A, 5B, and 5C are listed:

m=image 25 direct_smtp tcp
a=photo_l jpeg sycc
m=image 51100 t38fax tcp
a=iso_a4 iso_b4 mr b/w
m=image 25 t37fax tcp
a=iso_a4 iso_b4 tiff b/w
m=audio 51300 t30fax rtp/avp
a=iso_a4 iso_b4 mr b/w The number of image communication systems declared in the SDP media stream description is arbitrary.

In this embodiment, it is assumed that the "m=" line, which indicates mainly an image communication system, is related to the "a=" line, which indicates mainly image communication parameters, based on the principle of the above priority in the order of appearance for processing (for example, the "a=" line is treated as coming under the "m=" line immediately before it), and it is not explicitly specified. It is also possible, however, to adopt another description method for relating these two lines to each other, for example, by appending "rtpmap number" to the "m=" line and entering "rtpmap: number" into the corresponding "a=" line, as described in the related background art.

These two lines can be related to each other, for example, by appending "capability number" to the "m=" line and entering "capability: number" into the corresponding "a=" line. For example, if the system in FIG. 5A is expanded in this method, the description is as follows:

m=image 25 direct_smtp tcp 100
m=image 80 ippfax tcp 100
a=capability: 100 photo_l jpeg sycc The calling party can automatically determine which image communication system should be used for the called party without a need for an intervention of a user operation or a user setup by identifying a media stream description of an SIP message of the called party returned as described later.

Only if the SIP message including the SDP media stream description as shown in FIGS. 5A, 5B, 5C, and 5D can be returned to the calling party (image communication apparatus 105) from any apparatus only if it is an apparatus capable of functioning as a called party of an SIP session (the party receiving an INVITE).

For example, if the IP network interface 109 is configured as a network terminating unit for connecting only the image communication apparatus 108a of the analog system (or an analog telephone) to the IP network, a function of responding to an SIP session need be implemented in the IP network interface 109. In this configuration, the IP network interface 109 can return an SIP message including an SDP media stream description as shown in FIGS. 5A, 5B, 5C, and 5D to the calling party.

Similarly, the media gateway 111 and the facsimile gateway 113 can return an SIP message including an SDP media stream description as shown in FIGS. 5A, 5B, 5C, and 5D to the calling party according to a capability of the image communication apparatus 112, 113, 114 or 115 of a service subscriber. In this regard, the media gateway 111 only needs to return an SIP message including an SDP media stream description for offering the considered-speech facsimile communication as shown in FIG. 5D to the calling party, and the facsimile gateway 113 only needs to return an SIP message including an SDP media stream description for offering the T.38 Internet facsimile communication as shown in FIG. 5A to the calling party.

The following describes a concrete example of communication using an SIP message including an SDP media stream description as described above.

Figure 4A:
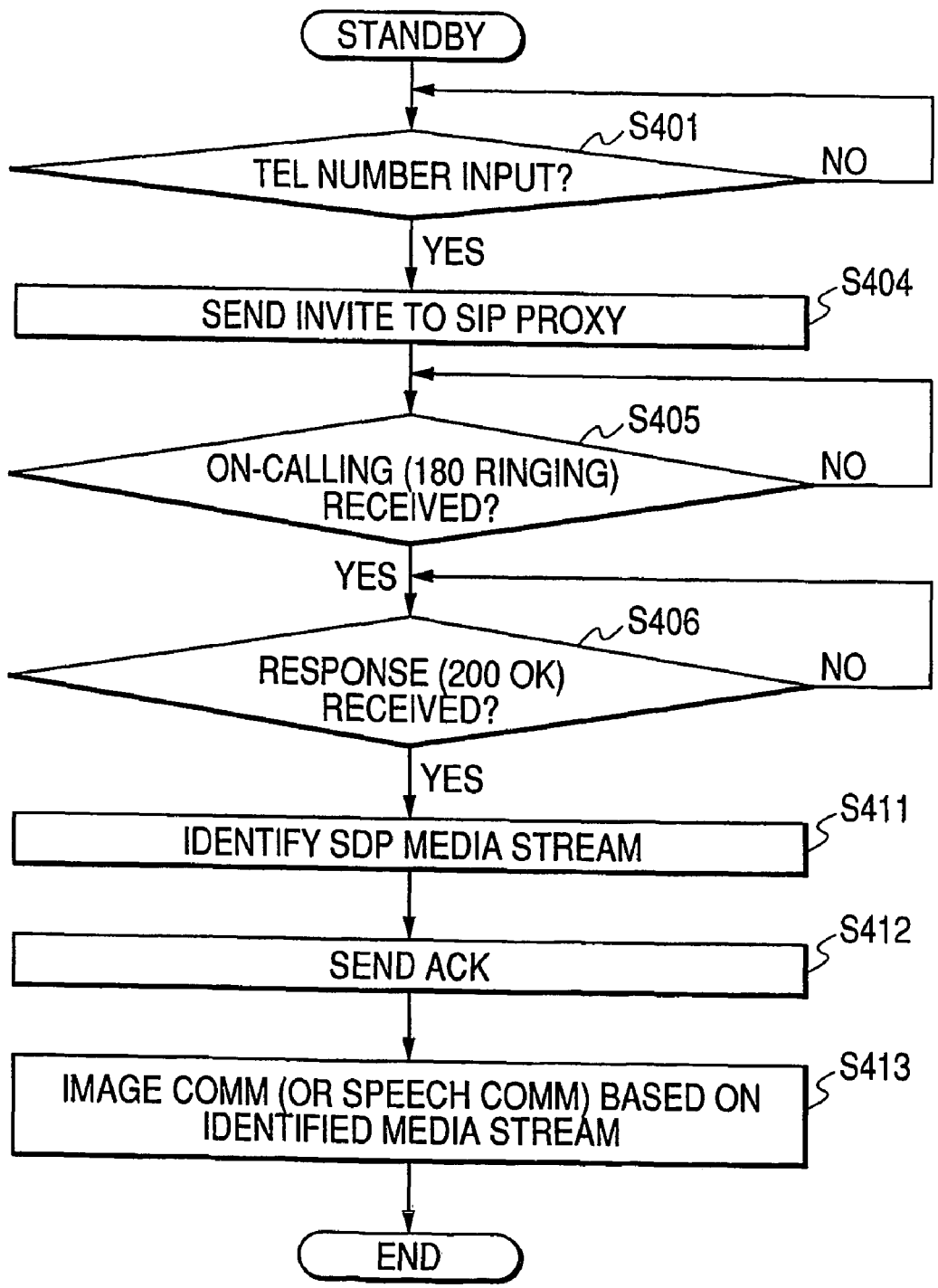
FIG. 4A is a flowchart showing a communication control of the image communication apparatus 105 in FIG. 1.
Figure 6:
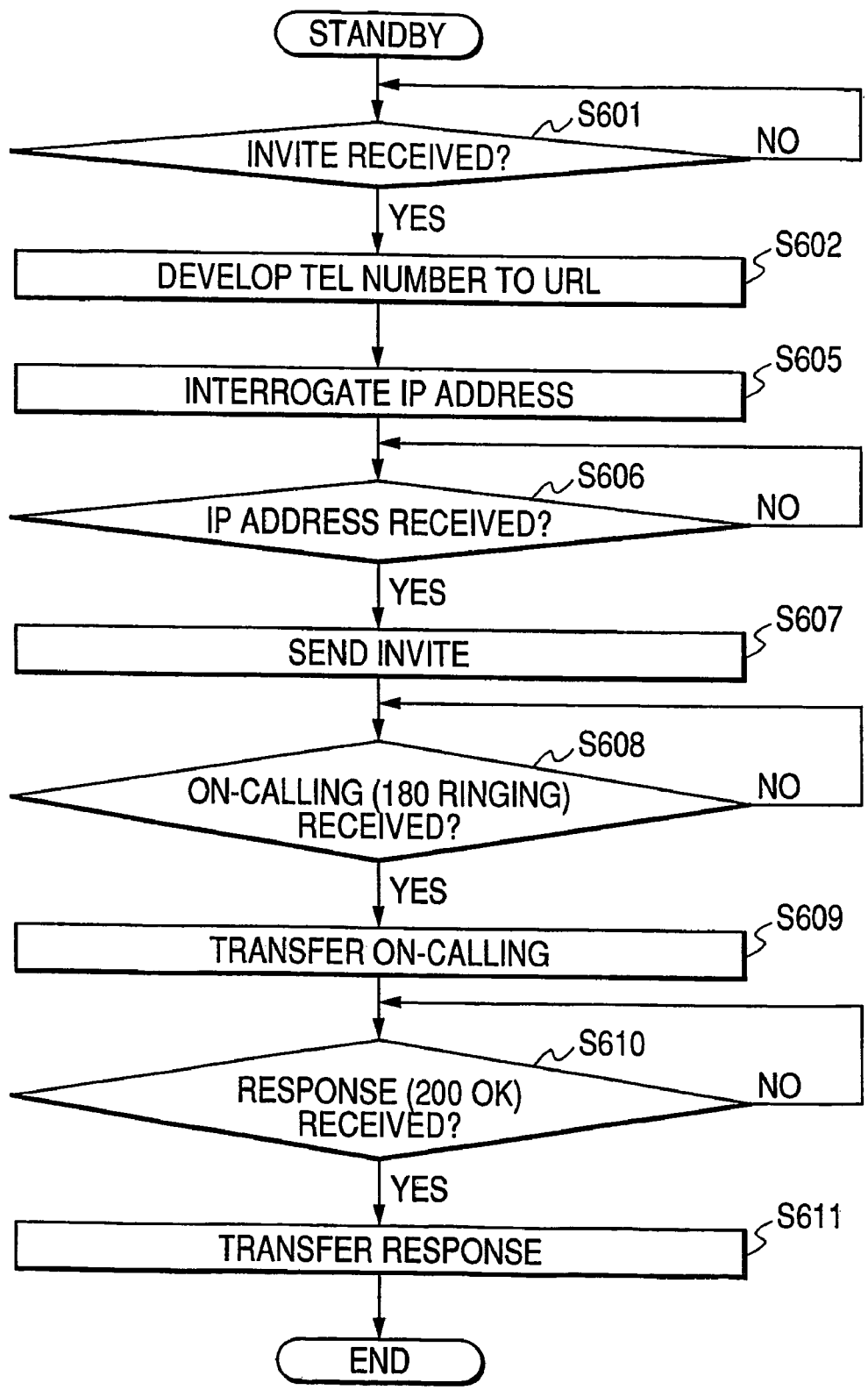
FIG. 6 is a flowchart showing a communication control of an SIP proxy shown in FIG. 1.

FIGS. 4A and 3B illustrate communication control procedures executed by the image communication apparatus 105, and FIG. 6 illustrates a communication control procedure executed by the SIP proxy 104. The communication procedures shown in FIGS. 4A and 4B need only be stored as control programs of the CPU 201 in the ROM 202.

Figure 4B:
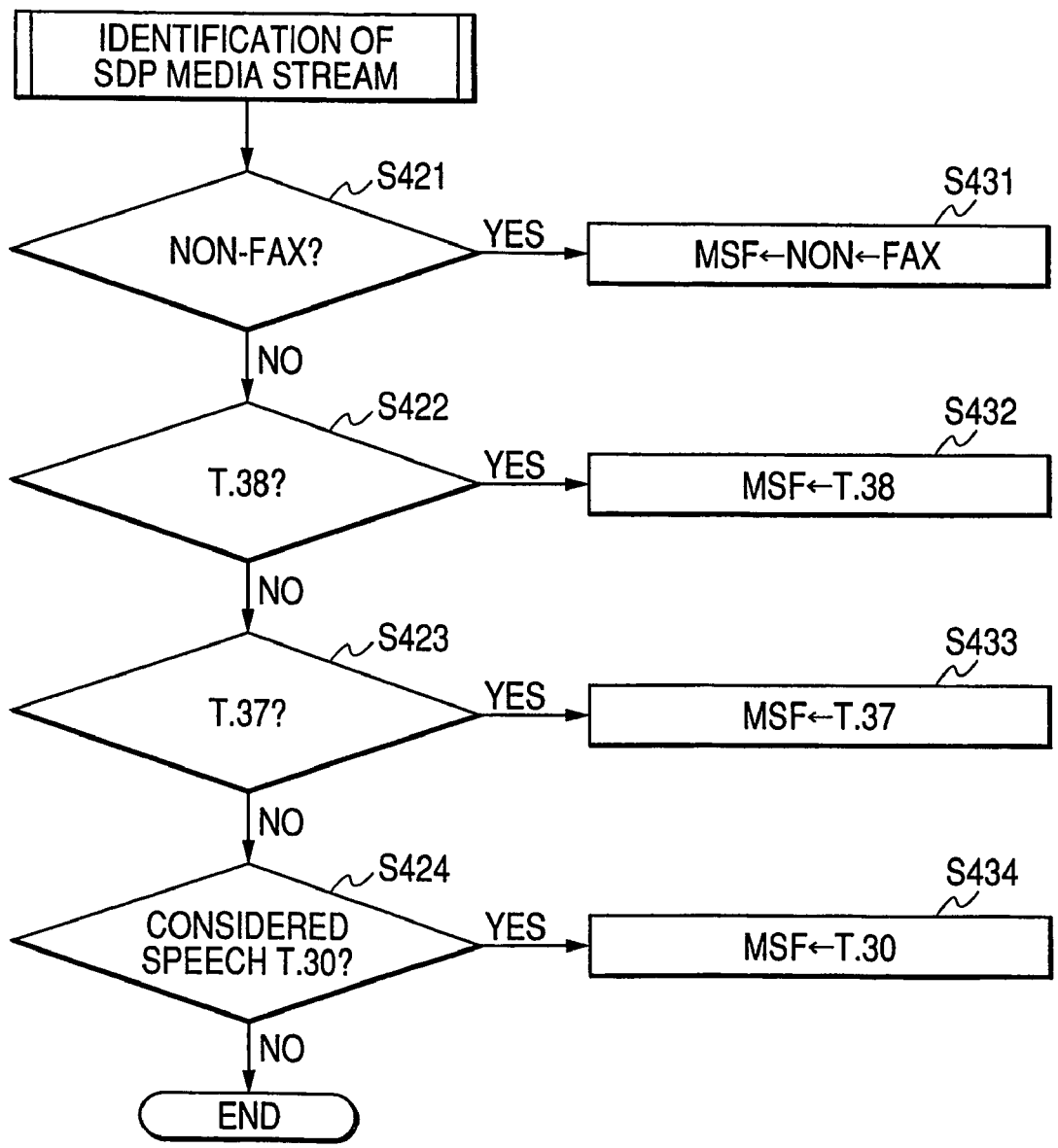
FIG. 4B is a flowchart showing a communication control of the image communication apparatus 105 in FIG. 1.

FIGS. 3A and 3B illustrate communication sequences achieved by the communication controls shown in FIGS. 4A and 4B and FIG. 6, with step numbers in FIGS. 4A and 4B and FIG. 6 appended to portions corresponding to those in FIGS. 4A and 4B and FIG. 6.

Referring to FIG. 3A, there is shown a communication sequence for starting image communication (or speech communication) from the image communication apparatus 105 to the image communication apparatus 108.

The image communication apparatus 105 supports a plurality of image communication systems, namely the following systems:

(1) IP image communication in non-facsimile protocol
(2) ITU-T Recommendation T.38 Internet facsimile communication
(3) ITU-T Recommendation T.37 Internet facsimile communication
(4) Considered-speech ITU-T Recommendation T.30 (G3) facsimile communication (It is assumed that the considered-speech T.30 (G3) facsimile communication in (4) is conducted by an image communication apparatus connected to an analog port not shown). Furthermore, it is assumed that the image communication apparatus 108 also supports the above four image communication systems similarly to the image communication apparatus 105 (The considered-speech T.30 (G3) facsimile communication in (4) is conducted by the image communication apparatus 108a connected to an analog port).

By executing the following communication controls, the image communication systems of the image communication apparatus 105 and the image communication apparatus 108 (or 108a) can be appropriately selected by means of the SDP media stream description of the SIP message returned from the image communication apparatus 108.

Upon depression of the image communication key 211a in the key operation portion 211 of the image communication apparatus subsequently to an input of a telephone number of a destination (step S401 in FIG. 4A), an IP address of the opponent party is acquired by using the SIP service in steps S404 to S406.

In step S404, an SIP session request message (an INVITE message) containing the telephone number information is sent via the CSMA/CD interface 107 connected to the ADSL modem 106 so as to correspond to the telephone number input to the memory. This SIP message is composed in the following text format:

INVITE sip:izumi@XXXX.co.jp SIP/2.0
Via:SIP/2.0/UDP soho.XXXX.co.jp
From: Michihiro Izumi <ippfax://izumi.XXXX.co.jp>
To: <tel: 050-1234-5678>
Call-ID:2ef-1737483932@soho.XXXX.co.jp
Cseq:1 INVITE
Content Type: application/SDP
v=0
o=mhandley 2890844526 2890842807 IN IP4 126.16.64.4
s=Image
t=2873397496 2873404696
m=image 25 direct_smtp tcp
m=image 80 ippfax tcp
a=photo_l jpeg sycc
m=image 51100 t38fax tcp
a=iso_a4 iso_b4 mr b/w
m=image 25 t37fax tcp
a=iso_a4 iso_b4 tiff b/w
m=audio 51300 t30fax rtp/avp
a=iso_a4 iso_b4 mr b/w As described above, in the text following a header including a description of destination information based on the input telephone number, parameters are described regarding capabilities of a terminal, particularly parameters of media stream processing capabilities, in the SDP format. To conduct image communication, an "s=" syntax is used to declare that the media type is image ("s=image" in the above) and a media stream description in an "m=" syntax is used to declare an image communication system (image communication method) that can be used by the terminal (the above "m=image 25 direct_smtp tcp" and subsequent portions).

In the above example, five "m=" syntaxes indicate that the image communication apparatus 105 can use the image sending/receiving protocols of direct SMTP, IPPFAX, T.38FAX, T.37FAX, and considered-speech T.30 systems (for the considered-speech T.30 system, it is assumed that the image communication apparatus 105 also has a connection with an analog line interface not shown and can use the connection). In the above example, it is declared that the image communication apparatus 105 can use an IPPFAX system and a direct SMTP system described later for IP image communication in a non-facsimile protocol.

Furthermore, particularly an image communication parameter related to "direct_smtp" and "ippfax" as non-facsimile protocols is used to declare that an image copy sent with an "a=" syntax is a JPEG image having photograph size L and that an sYCC color space for use in a digital camera is used. In this manner, the "a=" syntax is used to declare an image copy size, an image compression method, a color space, and other attribute information. By using the information, the receiving apparatus can determine whether it can perform print processing suitable for the image to be received.

To send the SIP message, UDP is used as a transport layer. Therefore, the CPU 201 of the image communication apparatus 105 appends a UDP header to the SIP message to generate a UDP frame and then stores it into the memory 203. IP address 193.168.0.1 of the SIP proxy 104 is entered as a destination address in the UDP header and IP address 194.168.0.1 of the image communication apparatus is entered as a source address. Furthermore, SIP well-known port number 5060 is entered as a destination port number and an arbitrary port number (for example, 5000) is entered as a source port number.

The CPU 201 transfers the UDP frame generated in this manner to the LAN controller 216. Upon receiving the sent data, the LAN controller 216 adds a media access control (MAC) header to it and sends it to the ADSL modem 106. The ADSL modem 106 having received the data sends the received data to the IP network 101. Various messages to be sent thereafter are sent in the same procedure.

For this packet, an IP address of the SIP proxy 104 is entered as the destination IP address. Therefore, it is delivered to the SIP proxy 104 via the IP network 101 (step S601 in FIG. 6).

The SIP proxy 104 develops the telephone number in the header of the received session request message into an address format such as "8.7.6.5.4.3.2.1.e164.arpa" (step S602) and then a DNS search is performed by the DNS server 103 (step S605). In this regard, for example, if the DNS server 103 only accepts a search in a URI format such as "ippfax:// xxx.co.jp/abc," a search for an ENUM server (not shown) is also performed for a conversion to the URI format, if necessary. The interrogated DNS server 103 returns the IP address 197.168.0.1 corresponding to the image communication apparatus 108 to the SIP proxy 104.

The SIP proxy 104 that has received the IP address of the opponent party, namely the image communication apparatus 108 from the DNS server (step S606) replaces the destination IP address in the packet received from the image communication apparatus 105 with the IP address of the image communication apparatus 108 received from the DNS server 103, replaces the source IP address with the IP address of the SIP proxy 104, and then sends a session request message to the image communication apparatus 108 (step S607).

On the other hand, the image communication apparatus 108 that has received the session request message sends an on-calling message to the SIP proxy 104. Before it is sent, source telephone number information described in the header of the received session request message is entered as a destination in the header of the on-calling message and an address of the SIP proxy 104, which is a source IP address of the session request message, is entered as a destination IP address. In this regard, the SIP message (on-calling message: 180 RINGING) sent from the image communication apparatus 108 (or the IP network interface 109) includes a media stream description in an SDP format in the same manner as for the INVITE message sent from the image communication apparatus 105. The SDP media stream description only is shown below out of the on-calling message sent from the image communication apparatus 108 (or the IP network interface 109):

m=image 25 direct_smtp tcp
m=image 80 ippfax tcp
m=image 51100 t38fax tcp
m=image 25 t37fax tcp
m=audio 51300 t30fax rtp/avp In this example, it is declared that the image communication apparatus 108 (and 108a) supports the same image communication systems as those of the image communication apparatus 105 (direct SMTP, IPPFAX, T.38FAX, T.37FAX, and considered-speech T.30 systems).

The above SDP media stream description is to be returned by the image communication apparatus 108 or the IP network interface 109. In a delivery situation of these apparatuses, however, generally they have no information on apparatuses connected to the analog port of the IP network interface 109. Therefore, in order to correctly perform a declaration related to the considered-speech T.30 system ("m=audio 51300 t30fax rtp/avp") as stated above, it is assumed that settings related to the apparatuses connected to the analog port of the IP network interface 109 are previously made by some user setting or automatic detection processing (the same is true for the image communication apparatus 105).

As soon as sending the on-calling message, the image communication apparatus sounds a ringing tone and displays information indicating that an incoming call for speech communication has been made.

The SIP proxy 104 that has received the on-calling message (step S608) replaces the destination IP address of the on-calling message with the IP address of the image communication apparatus 105 and replaces the source IP address with the IP address of the SIP proxy 104 before sending the message (step S609). Then, the image communication apparatus 105 receives the on-calling message (step S405 in FIG. 4).

Thereafter, a response message (200 OK) is sent to the image communication apparatus 105 via the SIP proxy 104 (step S406 in FIG. 4) by an appropriate key operation in the operation portion 211 of the image communication apparatus 108 (the image communication key 211a or the speech communication key 211b can be used in the configuration shown in FIG. 2B), offhook of a handset, or automatic receiving processing. In this regard, the SIP proxy 104 that has received the response message (step S610) converts only the destination IP address to an IP address of the image communication apparatus 105 and transfers the response message (step S611). Then, the image communication apparatus 105 receives the response message (step S406).

The image communication apparatus 105 can recognize the IP address of the image communication apparatus 108 by means of the source IP address in the response message received in step S406. Thereafter, a packet can be directly sent to the image communication apparatus 108 without involving the SIP proxy 104.

The image communication apparatus 105 may store the IP address 197.168.0.1 of the image communication apparatus 108 recognized here into the memory with associating it with the telephone number 050-1234-5678. It is performed for future communications with the image communication apparatus 108. If the IP address corresponding to 050-1234-5678 can be acquired by searching an appropriate area in the memory, the image communication apparatus 105 can access the image communication apparatus 108 without involving the SIP service, thereby enabling a faster call connection.

Upon receiving the response message in step S406 in FIG. 4A, the image communication apparatus 105 identifies the SDP media stream description in the message of the image communication apparatus 108 received before (step S411).

The SDP media stream identification processing is performed as shown in FIG. 4B.

While the SDP media stream description is based on the principle of the priority in the order of appearance (the priority is given from the top or leftmost portion) in the above explanation, the priority can be appropriately changed by an apparatus in the party reading the SDP media stream description and controlling the communication processing according to the result. In other words, the processing in FIG. 4B is simplified processing, in which the SDP media stream descriptions are identified (detected) in the order advantageous to the local machine and the processing ends when the appropriate media stream descriptions are identified (detected).

More specifically, the processing in FIG. 4B is arranged so that "m=" syntaxes in SDP media stream descriptions are detected in steps S421 to S424 and, if appropriate syntaxes are detected, values of corresponding media stream flags MSFs (disposed in a given area in the RAM 203) are determined in steps S431 to S434. Then, the SDP media stream descriptions are identified by using the predetermined order of priority advantageous to the terminal of interest: if the appropriate syntaxes are detected, the values of the media stream flags MSFs are immediately determined and the processing ends. In the example shown in FIG. 4B, only the image communication systems supported by the image communication apparatus 105 (terminal of interest) are identified. The media stream identification method shown in FIG. 4B is illustrative only. A modification of the media stream identification will be described later.

The order of identification in FIG. 4B is determined by primarily focusing on a property of communication, namely a high-speed or real-time transmission. Therefore, values of the media stream flags MSFs are determined and the processing ends when the appropriate syntaxes are detected in the following order:
(1) IP image communication in non-facsimile protocol
(2) ITU-T Recommendation T.38 Internet facsimile communication
(3) ITU-T Recommendation T.37 Internet facsimile communication
(4) Considered-speech ITU-T Recommendation T.30 (G3) facsimile communication Regarding the T.37 and T.38 Internet facsimile communications, T.37 communication may be faster in some cases and therefore there can be an arrangement in which the order of the methods (2) and (3) is reversed. The higher priority is given to T.38 here, however, due to its property or the real-time transmission.

In step S421 in FIG. 4B, it is determined whether the SDP media stream description of the image communication apparatus 108 includes a non-facsimile image communication system. If the image communication system is included, a value corresponding to the media stream flag MSF is stored. In this identification process, the SDP media stream description is searched from the first line in order to determine whether it includes keywords for use in declarations of the image communication systems of "direct_smtp" and "ippfax" (and "http," "ftp," etc.) (the search method is arbitrary: it can be a search under the condition of a matching part of a character string, a search with a regular expression, or the like).

The above example of the SDP media stream description of the image communication apparatus 108 begins with the following:
m=image 25 direct_smtp tcp Therefore, it is necessary to store a value indicating a non-facsimile method for the media stream flag MSF, for example, to store the value of "image 25 direct_smtp tcp" extracted out of the SDP media stream description of the image communication apparatus 108 directly.

According to the above example of the SDP media stream description of the image communication apparatus 108 and the arrangement shown in FIG. 4B, the media stream identification ends in this stage and the media stream flag MSF defines that the IP image communication in the non-facsimile protocol, particularly an image communication in the direct SMTP system is to be conducted. Even if the SDP media stream description of the image communication apparatus 108 previously includes a description other than "m=image 25 direct_smtp tcp," the non-facsimile image communication system is selected in this procedure shown in FIG. 4B.

In steps S422 to S424, "t38fax, "t37fax," and "t30fax" or other keywords are searched for in the same manner, respectively. Thereby, the SDP media stream descriptions are identified: if the appropriate syntax is detected, a value of the media stream flag MSF is determined in the stage.

Thereafter, the image communication apparatus 105 sends a response acknowledgement message (ACK) with the IP address of the image communication apparatus 108 specified as a destination IP address (step S412) to start the image communication based on the value of the media stream flag MSF determined as described above.

A call connection as stated above and a communication sequence of speech communication in a first session are as shown in FIG. 3A.

In the above example, the image communication in the direct SMTP, which is a non-facsimile protocol, is to be established between the image communication apparatuses 105 and 108. FIG. 3B shows a situation of the direct SMTP communication in which data is directly exchanged between the image communication apparatuses 105 to 108.

In FIG. 3B, the image communication apparatus 105 operates as an SMTP client and the image communication apparatus 108 operates as an SMTP server. Thereby, the SMTP communication is directly conducted without a use of a separate SMTP server, when the image communication apparatus 105 sends image data to the image communication apparatus 108.

The SMTP protocol shown in FIG. 3B per se is well known, having no particular features in its content. Specifically, after an exchange of the following text message (each numeral in parentheses indicates the image communication apparatus 105 or the image communication apparatus 108), an e-mail text (MIME-encoded or the like) including image data is sent from the image communication apparatus 105 to the image communication apparatus 108:
HELO (105)
250 OK (108)

MAIL FROM (105: Including sender identification information)
250 OK (108)

RCPT TO (105: Specifying destination)
250 OK (108)

Regarding the image communications in other image communication systems selected based on the exchange of the SDP media stream description and executed in step S413 (IPPFAX, T.38/T.37 facsimile communication, considered-speech T.30 facsimile communication, and the like), their image communication procedures are equivalent to well-known ones and therefore their detailed diagrams are omitted in this embodiment.

As stated above, the image communication systems (protocols or methods) usable between the image communication apparatuses 105 to 108 can be identified by using an SDP media stream description (particularly, "m=" syntax) expanded (or developed) by an SIP message. Thereby, the image communication apparatus 105 (108) can automatically determine an image communication system (protocol or method) used for practical communication without a need for a complicated user operation or user setup operation.

Furthermore, the image communication control parameters used for practical communication can be identified by using an SDP media stream description (particularly, "a=" syntax) expanded by an SIP message. Therefore, the image communication control parameters, particularly a size, a compression method, a color space, and other capabilities can be recognized, thereby enabling optimum controls of a size and a color in postprocessing (print or any other appearance processing) of a sent image in the receiving apparatus.

While the communication between the image communication apparatuses 105 and 108 has been illustrated in the above description, the apparatuses capable of returning an SIP message including the SDP media stream descriptions as shown in FIGS. 5A, 5B, 5C, and 5D are not limited to the image communication apparatuses 105 and 108 as stated above.

The apparatus capable of returning the SIP message including the SDP media stream descriptions as shown in FIGS. 5A, 5B, 5C, and 5D can be any apparatus only if it can respond to the SIP message such as, for example, the media gateway 111, the T.38 facsimile gateway 113, and the IP network interface 109.

Particularly, the media gateway 111 and the IP network interface 109 can return an SIP message including an SDP media stream description for declaring a considered-speech T.30 analog facsimile communication such as "m=audio 51300 t30fax rtp/avp" for the image communication apparatus 112 connected to the PSTN 120 or the image communication apparatus 108a connected to the analog interface 110a of the IP network interface 109. This enables the calling image communication apparatus 105 to conduct the T.30 analog facsimile communication in which an analog facsimile speech signal is surely sent in the VoIP protocol to these called apparatuses.

Regarding the media gateway 111, a line or service carrier only needs to setup the media gateway 111 in such a way as to return the SIP message including the SDP media stream description for declaring the considered-speech T.30 analog facsimile communication as mentioned above.

Regarding the image communication apparatus 108a connected to the analog interface 110a of the IP network interface 109, a component member of the IP network interface 109, for example, an ADSL modem can return the SIP message including the SDP media stream description for declaring the considered-speech T.30 analog facsimile communication as follows for the image communication apparatus 108a (for example, a G3 analog facsimile machine) connected to the analog port of the terminal of interest:
m=audio 51300 t30fax rtp/avp
a=iso_a4 iso_b4 mr b/w It is assumed that, however, whether the device connected to the analog port is a telephone or a G3 analog facsimile machine is determined by means of a setup operation of a component of the IP network interface 109 such as, for example, the ADSL modem or by means of appropriate automatic determination processing of the ADSL modem.

While the image communication control parameters are assumed to be included in the "a=" syntax in the above description, an SDP media stream description in an "m=" syntax can include communication control parameters preferable to be used for the image communication as well as the image communication system. For example, to declare the considered-speech T.30 analog facsimile communication, it is necessary to select a VoIP speech encoding method appropriately in order to conduct optimum image communication. It will be more suitable to declare this kind of image communication control parameter in an "m=" syntax instead of an "a=" syntax, unlike an attribute of image data.

For example, the IP network interface 109 or the media gateway 111 in the image receiving party (or the image communication terminal 105 in the sending party) can use the SDP media stream description to declare that a PCM encoding method equivalent to a 64 kbps transmission speed should be used as a speech encoding method suitable for a digital/analog conversion of a speech signal, which is performed by the IP network interface 109 connected to the image communication apparatus 108a or the media gateway 111 for relaying communication for the image communication apparatus 112. The "m=" syntax in this condition can be, for example, as follows:

m=audio 51300 t30fax rtp/avp 64 kbps

In this manner, the considered-speech T.30 analog facsimile communication can be conducted reliably. The reason for specifying the PCM encoding method equivalent to the 64 kbps transmission speed is that a speed lower than that may cause a decrease of the image transmission speed due to a fallback caused by a training failure. The PCM encoding method equivalent to the 64 kbps transmission speed would ensure at least 14.4 kbps (ITU-T Recommendation V.17 modulation method) or higher facsimile transmission speed.

While the SDP media stream identification processing shown in FIG. 4B is arranged so that the "m=" syntax in the SDP media stream description is detected and, if the appropriate syntax is detected, a value of the corresponding media stream flag MSF is determined and the processing ends, the SDP media stream identification method is not limited thereto.

For example, while the order of identification shown in FIG. 4B is determined mainly by focusing on the property of communication, namely the high-speed or real-time transmission, it is apparent that the SDP media stream identification processing can be performed in order of identification different from one shown in FIG. 4B in accordance with other standards.

Furthermore, if the appropriate syntax is detected, a control can be made to add an appropriate value to the media stream flag MSF cumulatively whenever the appropriate syntax is detected, instead of the immediate end of the processing. For example, for the control in FIG. 4B, an appropriate value is added to the media stream flag MSF in steps S431 to S434 (in this case, if an image communication system that cannot be treated by the terminal of interest is detected in the SDP media stream identification processing illustrated in FIG. 4B, it can be resolved by storing an invalid value at the media stream flag MSF and thereafter deleting the image communication system and determining a new image communication system). Upon completion thereof, the control progresses to steps S422 to S424 directly under the step.

Subsequently, before the start of the image communication in step S413, an image communication system used practically with the other terminal on the basis of any other appropriate algorithm. An algorithm of selecting an image communication system usable at that time, particularly an algorithm of selecting an image communication system when a plurality of image communication systems can be used for communication with the opponent party may be predetermined on the basis of the property of communication, namely the high-speed or real-time transmission as stated above. Otherwise, there can be a situation that a user selects preferred image communication systems and, if necessary, further previously implements a user interface for performing a device setup enabling a determination of their priority.

In the above first embodiment, particularly the direct SMTP and IPPFAX have been exemplified as non-facsimile image communication protocols. It is apparent, however, that the FTP, HTTP, RCP, SMTP (for example, in which image communication apparatuses exchange image data directly without using ITU-T Recommendation T.37), and any other IP communication/file transfer protocols can be identified between the sending and receiving apparatuses in quite the same manner as for the example of IPPFAX described above by preparing an "m=" syntax for an SDP media stream syntax for identifying these image communication systems (in step S431 in FIG. 4B, it is only necessary to store values corresponding to ftp, http, rcp, and smtp detected from the "m=" syntaxes), thereby achieving the same effects.

In the above description, on the assumption that the opponent party in the image communication is specified by the user-input telephone number, the operation has been described for a case where the station of the opponent party is called from an input telephone number via the SIP service and image data is sent to the station.

If, however, a user specifies an e-mail address stored as telephone book data (not shown) instead of a telephone number as a destination of the image, it is possible to transmit an e-mail text generated by encoding the image data to be sent (its read or input path is arbitrary) in a MIME format via the ISP mail server (a normal transmission via e-mail) without exchanging the SIP message. This makes it possible to send e-mail with image data appended thereto to a terminal (for example, a personal computer capable of receiving e-mail) other than the facsimile machine or other image communication apparatuses.

In this manner, if the destination is selected in a format other than a telephone number, there is no need for processing (processing time) required for the SIP protocol and image data can be sent at a high speed by sending or receiving an image in the IP image communication system, which is a non-facsimile protocol, without exchanging the SIP message.

The image data that the image communication apparatus 105 can send by the above image communication control may be image data read from any other external unit or a storage media such as arbitrary image data such as, for example, JPEG image data input from a digital camera, as well as image data read by the CIS 204.

While the calling image communication apparatus 105 is in the image sending party and other image communication apparatuses 108, 108a, 112, and 115 are in the image receiving party in the above description, the direction of sending or receiving an image is not limited thereto. Only if they are supported by image communication systems in practical use (for example, a polling protocol is defined in ITU-T Recommendation T.30), it is apparent that an image transmission or reception in a reverse direction to the above can be performed similarly.

While the present invention is applicable to communication apparatuses for performing speech communication and image communication via an IP network, the communication apparatuses can also be configured as dedicated devices or can be embodied by using image input/output units such as a scanner or a camera interface and hardware such as a personal computer (PC) having a network interface. Particularly, the method or the program according to the present invention can be introduced into the PC hardware via an appropriate storage medium or via a network when using the PC hardware.

By using the above configuration, according to the present invention, a transmitter and a receiver to conduct image communication can identify image communication systems that they can use mutually by using SDP media stream descriptions expanded by an SIP message. Therefore, they can automatically determine image communication systems (protocols or methods) and image communication control parameters used in practical communication without a need for complicated user operations or user setup operation, thereby enabling fast and reliable image communication very advantageously.

Particularly, image communication control parameters, for example, an encoding method in considered-speech communication, an image compression method, an image size, a color space and other information are exchanged before sending an image. Thereby, the receiving terminal can process the received image reliably and can perform output processing suitable for the image.

This application claims priority from Japanese Patent Application No. 2003-309458 filed Sep. 2, 2003, which is hereby incorporated by reference herein.

The invention claimed is:

1. An image communication control method for conducting image communication by using one of a plurality of different image communication systems via sending/receiving paths including an IP network,
wherein a transmitter and receivers for conducting the image communication or devices for relaying the image communication existing in the sending/receiving paths include SDP media stream descriptions in an SIP message and send it on the basis of an SIP protocol, the SDP media stream descriptions comprising different image communication systems usable by the transmitter and the receivers for conducting the image communication and image communication control parameters described based on given syntaxes;
wherein the transmitter and the receivers for conducting the image communication select an image communication system for use in practical image communication and image communication control parameters to be used in the appropriate image communication system in given order of priority on the basis of the SDP media stream descriptions in the SIP message received from an apparatus in the opponent party and control the image communication and output processing in the image receiving party by using the selected image communication system and image communication control parameters,
wherein when the image communication control parameters of the SDP media stream descriptions are parameters indicating that image data is sent or received in the considered-speech ITU-T Recommendation T.30 facsimile communication system, they include information specifying a speech encoding method suitable for digital/analog conversion of a speech signal, and
wherein the image communication system for use in the image communication and the image communication control parameters to be used in the appropriate image communication system are selected in order of priority based on order of appearance in the SDP media stream descriptions in the SIP message.

2. The method according to claim 1, wherein the image communication system is one of an IP image communication system in a non-facsimile protocol, an ITU-T Recommendation T.38 Internet facsimile communication system, an ITU-T Recommendation T.37 Internet facsimile communication system, and a considered-speech ITU-T Recommendation T.30 facsimile communication system.

3. The method according to claim 1, wherein the image communication control parameters in the SDP media stream descriptions include information for specifying a size density, image compression method, or color space of the image data to be sent or received.

4. The method according to claim 1, wherein, if a destination is selected in a format other than a telephone number, an image is sent or received by using the IP image communication system in the non-facsimile protocol without performing an exchange of the SIP message.

5. A non-transitory computer-readable storage medium on which is stored an image communication control program, comprising the step of controlling communication controls of a transmitter and receivers for conducting image communication or devices for relaying the image communication existing in a sending/receiving path in order to use the image communication control method according to claim 1.

6. An image communication apparatus, comprising a transmitter for conducting image communication by using the image communication control method according to claim 1 or a receiver for conducting image communication by using the image communication control method according to claim 1 or a device for relaying the image communication existing in a sending/receiving path by using the image communication control method according to claim 1 existing in a sending/receiving path.

7. The method according to claim 2, wherein said IP image communication system in a non-facsimile protocol is any one of HTTP, SMTP, FTP and IPPFAX.

8. An image communication control method according to claim 1, wherein the information specifying a speech encoding method adequate for digital/analog conversion of a speech signal indicates a PCM encoding method equivalent to the 64 kbps transmission speed.

* * * * *